(12) United States Patent
Collins et al.

(10) Patent No.: US 12,013,299 B1
(45) Date of Patent: Jun. 18, 2024

(54) PRESSURE GUAGE ATTACHMENT SYSTEM AND METHOD OF ASSEMBLY

(71) Applicant: ATRION MEDICAL PRODUCTS, INC., Arab, AL (US)

(72) Inventors: Jonathan Collins, Arab, AL (US); Rowland W. Kanner, Arab, AL (US)

(73) Assignee: ATRION MEDICAL PRODUCTS, INC., Arab, AL (US)

( * ) Notice: Subject to any disclaimer, the term of this patent is extended or adjusted under 35 U.S.C. 154(b) by 0 days.

(21) Appl. No.: 18/437,434

(22) Filed: Feb. 9, 2024

Related U.S. Application Data

(60) Provisional application No. 63/444,823, filed on Feb. 10, 2023.

(51) Int. Cl.
  *G01L 19/00* (2006.01)
  *G01L 19/16* (2006.01)

(52) U.S. Cl.
  CPC .......... *G01L 19/16* (2013.01); *G01L 19/0007* (2013.01)

(58) Field of Classification Search
  CPC ............................ G01L 19/16; G01L 19/0007
  See application file for complete search history.

(56) References Cited

U.S. PATENT DOCUMENTS

| | | | |
|---|---|---|---|
| 4,876,894 A | 10/1989 | Heller et al. | |
| 6,314,816 B1 | 11/2001 | Wiegand | |
| 6,684,712 B2 | 2/2004 | Klein et al. | |
| 8,162,582 B2 * | 4/2012 | Stoll | G01D 11/245 |
| | | | 73/756 |
| 9,702,740 B2 | 7/2017 | Breunig et al. | |
| 9,907,944 B2 * | 3/2018 | Liebe | A61M 39/00 |
| 11,204,119 B2 * | 12/2021 | Weiss | F16L 37/0915 |
| 2016/0305798 A1 * | 10/2016 | Breunig | G01L 19/003 |

* cited by examiner

*Primary Examiner* — Freddie Kirkland, III
(74) *Attorney, Agent, or Firm* — Clark Hill PLC; James R. Foley

(57) ABSTRACT

A pressure gauge attachment system includes a thread having a thread stop as well as at least one engagement element that is configured to defect during installation and effectively provide an interlock after installation. The system is suited for rapid and simplified installation, inherently provides automatic orientation of a pressure indicator, enhanced sustainability, flexibility in manufacturing, as well as provides a secure, reliable fluid-tight sealed connection that does not rely upon a pipe thread, additional couplings or clamping nuts for retention.

20 Claims, 13 Drawing Sheets

PRESSURE GUAGE ATTACHMENT SYSTEM AND METHOD OF ASSEMBLY

RELATED APPLICATION (PRIORITY CLAIM)

This application claims the benefit of U.S. Provisional Application Ser. No. 63/444,823, filed Feb. 10, 2023, which is hereby incorporated herein by reference in its entirety.

BACKGROUND

The present invention generally relates to pressure gauges and the way they are attached to manometers, and more specifically relates to a novel pressure gauge attachment system which could be employed with, for example, medical inflation devices, and which provides rapid and simplified installation, reliable sealing, and automatic correct orientation of the pressure indicator.

Pressure measurement assemblies such as bourdon tube manometers or digital displays of transducers are used across a multitude of industries and applications. These gauges are typically available as a complete unit with the measurement device effectively integrated with the connection structure.

The most common connection method is a tapered pipe thread connection located on a stem which protrudes either radially or axially from a gauge assembly. The reason this connection method is popular is because it allows for both securement and sealing in most applications. With this method, gauge orientation is achieved by varying the degree of tightening applied to the threaded connection.

Alternative gauge connections have been developed for specialized applications, such as those described in U.S. Pat. Nos. 4,876,894 and 9,702,740, in order to solve specific problems of or derived from vibration, temperature, or gauge orientation. The disadvantage of these connection methods is their unsuitability for low cost, high-volume, high-quality production applications, such as the high-volume manufacture of a disposable medical device. For these applications, the pressure gauge connection should be performed using a method that is efficient, reliable, and repeatable.

Structures for attaching a pressure measurement module to a pressurized chamber oftentimes include a connection adapter, which provides a male portion, which fits into a corresponding female portion, oftentimes provided in the form of a receiving socket. The elemental components of such a pressure measurement module often include a mechanical gauge, simply comprised of a bourdon tube, a clockwork mechanism, an indicator needle, a dial face and a communication port. Analog modules of this nature are disclosed, for example, in U.S. Pat. Nos. 6,314,816 and 6,684,712. However, such a module could instead be electronic in nature and be comprised of a pressure transducer, logic board, display, and battery. The module could even consist of a combination of mechanical and electronic constructions.

Regardless of the structure of the module itself (i.e., whether it is analog, digital, or a combination thereof), some structures for connecting the module to a socket do not inherently provide for rapid and simplified installation, reliable sealing, or automatic correct orientation of the pressure indicator (i.e., after installation, the digital readout or the analog dial may at an undesirable angle for viewing).

Furthermore, some connection structures are burdensome because they consist of too many components, are difficult to manufacture and/or are difficult to assemble.

For example, a plurality of pressure gauge connections in the market consists of metallic stems threaded with tapered pipe threads. This connection system typically involves a tapered pipe thread which, at a point during installation, achieves a designed interference between the gauge thread and the socket thread, thereby forming a fluid-tight seal. The axial and radial location of the threads cut onto these metallic threaded stems are not typically well controlled. As a result, it is not generally possible to predict the installation depth, or the number of turns which will produce both securement and a reliable seal along with proper orientation. Therefore, the use of these tapered threaded stems is not desirable in the case of a receiving socket produced in high volume. Additionally, due to the unpredictable nature of threads being machined on a metal stem and in a socket, correct alignment of the gauge dial face and correct installation depth can differ as much as one full rotation between devices, thereby substantially influencing the effectiveness of the overall seal between the parts.

Unfortunately, if plastics are used instead of metal, plastics can exhibit thread socket failures that compromise the sealing or retention of the gauge (for example due to creep or stress fracturing). When threads are provided in a plastic socket, the threads must only be used for retention, and an external sealing mechanism (such as an O-ring or adhesive) must be used in order to retain the gauge without leakage occurring.

Some prior art devices, such as the devices disclosed in U.S. Pat. Nos. 4,876,894 and 9,702,740, require the use of tools or deformable attachment sockets (i.e., on the pressure vessel) in order to properly and reliably install and retain the gauge.

A reliable seal is extremely important for connection of a pressure gauge assembly to a medical device pressure chamber. There are many challenges associated with using threaded stems in plastic receiving sockets. Gauge connections having an external thread interference or face sealing method typically do not allow for adjustment of orientation alignment without causing either a decrease of sealing function or over-compression of the seal. There are two main reasons for this: either the seal is being created by compressing a seal with the end face of the threaded stem, or the amount of sealing interference is directly related to the installation depth between the stem and socket threads. If a face seal is created during installation, then adjustment of the orientation can easily cause over or under compression of the elastomeric seal. If tapered threads are being used for a seal, then a sealant or adhesive must be used, and both the stem and socket need to be made from rigid materials that are not prone to creep relaxation. Unfortunately, plastics creep over time to relieve any stress placed upon them and they can be chemically attacked by the adhesive or sealant. As a result, plastics do not make a good candidate for this type of seal.

SUMMARY

An object of an embodiment of the present invention is to provide a pressure gauge attachment system that is particularly suited for rapid and simplified installation.

Another object of an embodiment of the present invention is to provide a pressure gauge attachment system that inherently provides automatic orientation of a pressure indicator and reliable sealing with regard to a receiving socket.

Yet another object of an embodiment of the present invention is to provide a pressure gauge attachment structure that provides enhanced sustainability as well as flexibility in manufacturing.

Yet another object of an embodiment of the present invention is to provide a pressure gauge attachment system that provides a secure, fluid-tight connection that does not rely upon stress inducing pipe threads, sealants, or adhesives, or additional couplings or clamping nuts for retention.

Yet another object of an embodiment of the present invention is to provide a pressure gauge attachment to be oriented in an angular position to more directly face the viewer for easier reading, whereby the plane of the gauge face need not be limited to an orientation that is either perpendicular or parallel to the central axis of the gauge mounting socket.

Briefly, an embodiment of the present invention provides a pressure gauge attachment system which comprises a thread having a thread stop as well as at least one engagement element that is configured to momentarily deflect during installation and effectively provide an interlock after installation. The system is particularly suited for rapid and simplified installation, inherently provides automatic orientation of a pressure indicator, enhanced sustainability, flexibility in manufacturing, along with a secure, reliable fluid-tight sealed connection not reliant upon pipe threads, additional couplings or clamping nuts for retention.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DESCRIPTION OF ILLUSTRATED EMBODIMENTS

Figure 1:
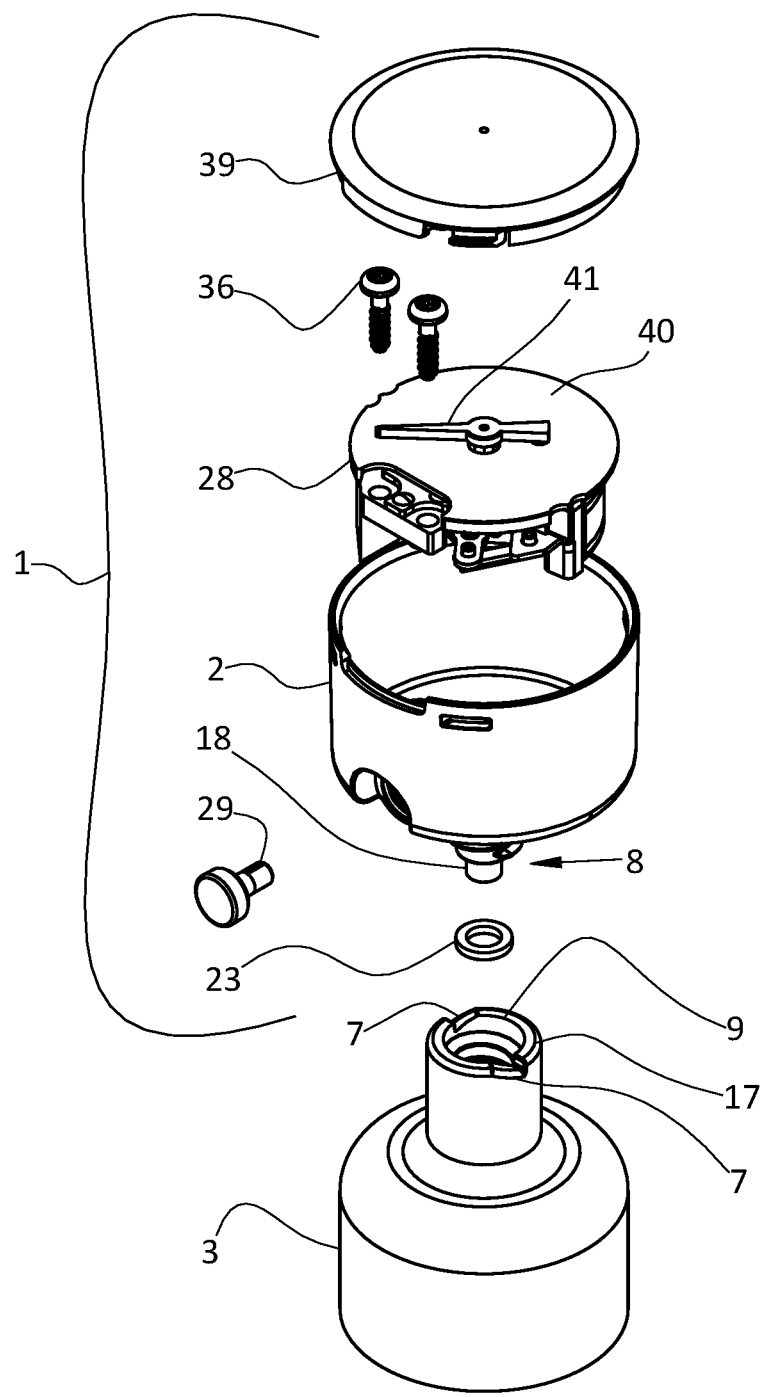
FIG. 1 is an exploded perspective view showing a pressure measurement assembly over a receiving socket of a pressure vessel.

While this invention may be susceptible to embodiment in different forms, there are shown in the drawings and will be described herein in detail, specific embodiments with the understanding that the present disclosure is to be considered an exemplification of the principles of the invention, and is not intended to limit the invention to that as illustrated.

An embodiment of the present invention provides a pressure gauge attachment system that is particularly suited for rapid and simplified installation, inherently provides automatic orientation of a pressure indicator, enhanced sustainability, flexibility in manufacturing, as well as provides a secure, reliable fluid-tight sealed connection that does not rely upon a pipe thread, sealants, adhesives, additional couplings or clamping nuts for retention. As will be described, the system comprises a thread stop mechanism as well as structure that momentarily deflects during installation and effectively ultimately provides a reliable interlock.

Specific example embodiments are shown in the drawings, but other embodiments are entirely possible while staying with the scope of the present invention.

The first embodiment of the present invention will now be described starting with reference to what is illustrated in FIG. 1. Shown in FIG. 1 is a pressure measurement assembly 1 and (a portion of) a pressure vessel 3. The pressure measurement assembly 1 is shown exploded in order to expose and illustrate each of the individual components thereof. The pressure vessel 3 includes a socket 9 which is configured to receive and mate with a corresponding connection port 8 of the pressure measurement assembly 1. The invention relates to the connection port 8 and corresponding socket 9; however, other components of the pressure measurement assembly 1 and pressure vessel 3 are shown and described just to provide an example despite the fact that these components can take other forms while still staying within the scope of the present invention.

As shown in FIG. 1, the pressure measurement assembly 1 can include a lens 39, mechanical fastening means 36 such as threaded screws, bolts or barbs, a unitary gauge housing 2, and a pressure measurement module 28. Pressure measurement modules as illustrated in FIG. 1 are commercially available with multiple means of measuring and indicating pressure. A typical mechanical pressure measurement module is shown in the drawings herein. However, it is conceivable that an electronic or a combination mechanical-electronic measurement module might be utilized instead.

Figure 7:
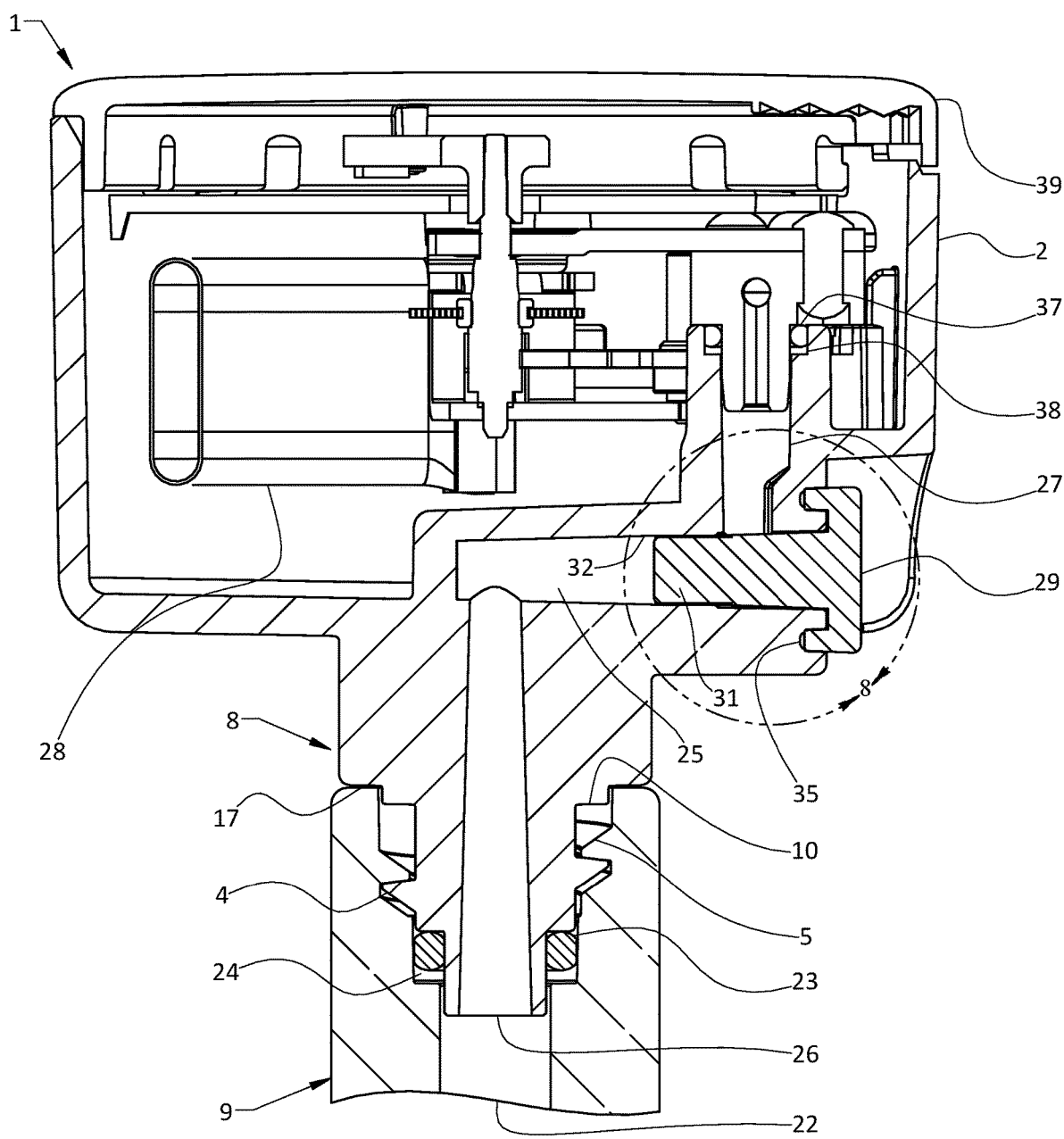
FIG. 7 is a cross sectional view similar to the cross-sectional view contained in FIG. 6, but shows the entire pressure measurement assembly and not just the unitary gauge housing.

The pressure measurement module 28 is joined to the unitary gauge housing 2 utilizing the mechanical fastening means 36. As shown in FIG. 7, a fluid-tight seal is achieved by radially compressing a pressure measurement module sealing element 37 within gauge seal pocket 38 of the unitary gauge housing 2. As shown in FIG. 1, the lens 39 is preferably made to snap in place onto the unitary gauge housing 2 to protect dial face 40 and indicator needle 41 of pressure measurement module 28. As such, the pressure measurement assembly 1 includes a housing 2 having a pressure gauge module 28 installed within, and a clear lens 39 to provide a window to view the indicator face 40 of the gauge. The exemplary housing 2 is configured to receive the pressure measurement module 28, such as a bourdon-tube gauge module or electronic gauge module, retained by means of mechanical fastening 36. However, gauge module securement need not be limited to the mechanical fasteners shown since a multitude of different methods could be utilized to secure the pressure measurement module 28 within the housing 1.

The connection port 8 of the pressure measurement assembly 1 and the corresponding socket 9 of the pressure vessel 3 will now be described. The connection port 8 and corresponding socket 9 are configured such that they do not rely upon a pipe thread, sealants, adhesives, additional couplings or clamping nuts for retention. Instead, as shown in FIGS. 2 and 3, the connection port 8 includes an external thread 4, and this external thread 4 engages, and mates, with a corresponding internal thread 5 that is provided on the inside (i.e., on the inner diameter) of the receiving socket 9 (see, for example, FIGS. 5 and 7).

Figure 2:
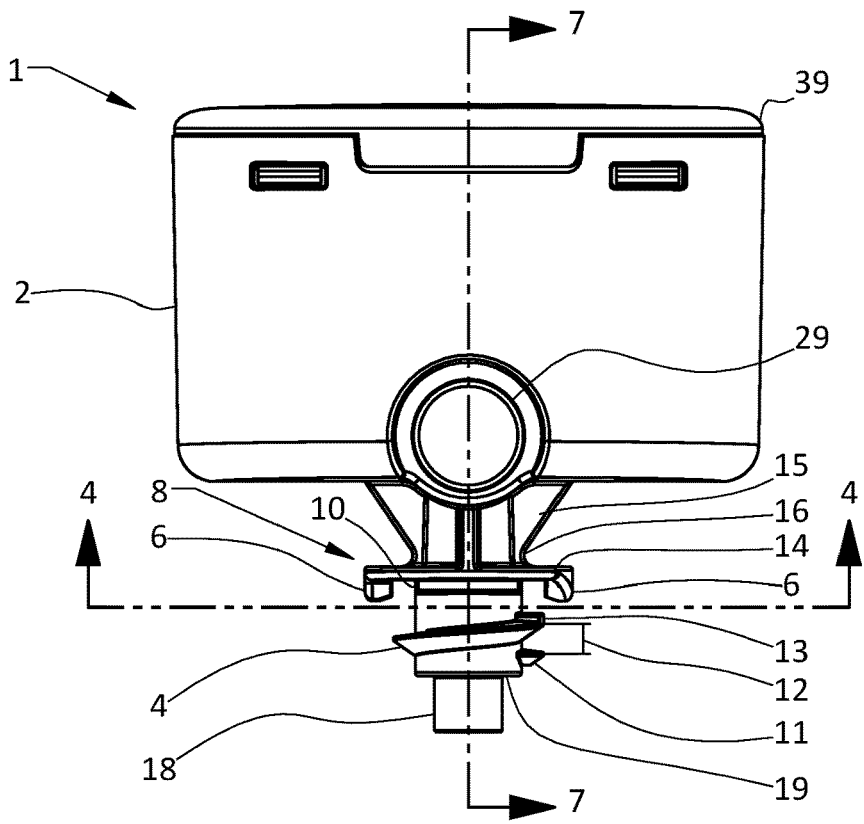
FIG. 2 is a front view of the pressure measurement assembly of FIG. 1, but showing the assembly assembled instead of exploded.
Figure 3:
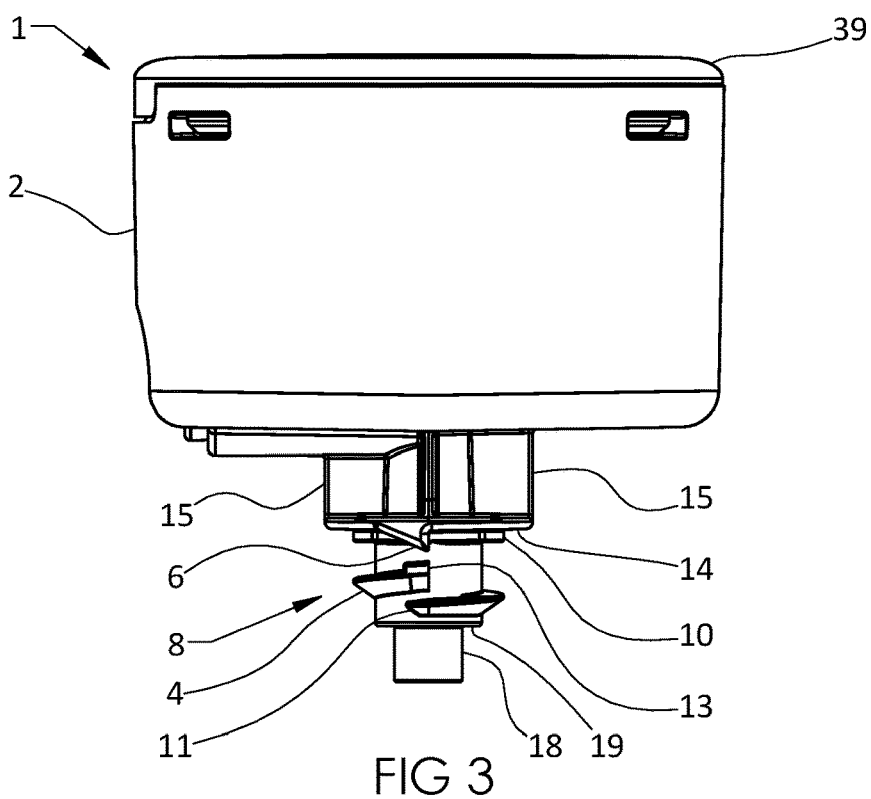
FIG. 3 is a side view of the assembled pressure measurement assembly.
Figure 4:
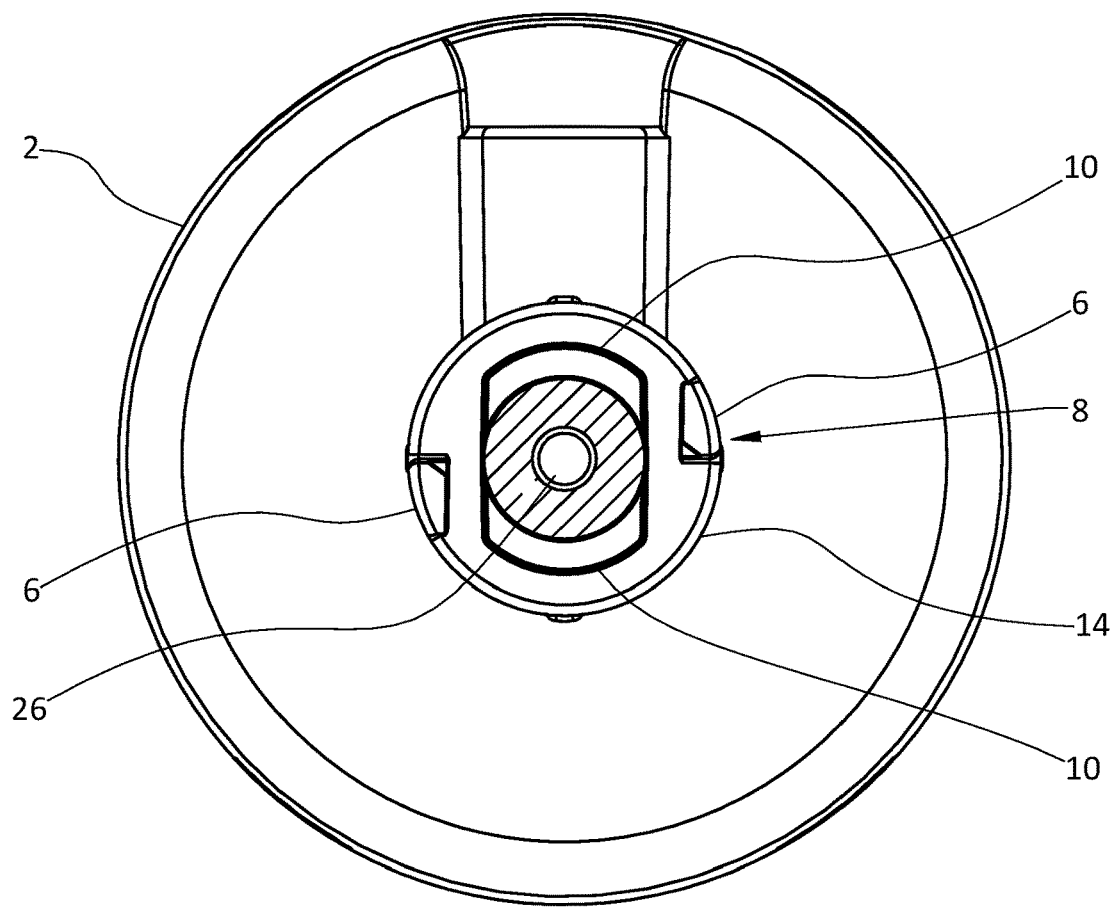
FIG. 4 is a cross sectional view of a connection port of the pressure measurement assembly, taken along line 4-4 of FIG. 2.
Figure 5:
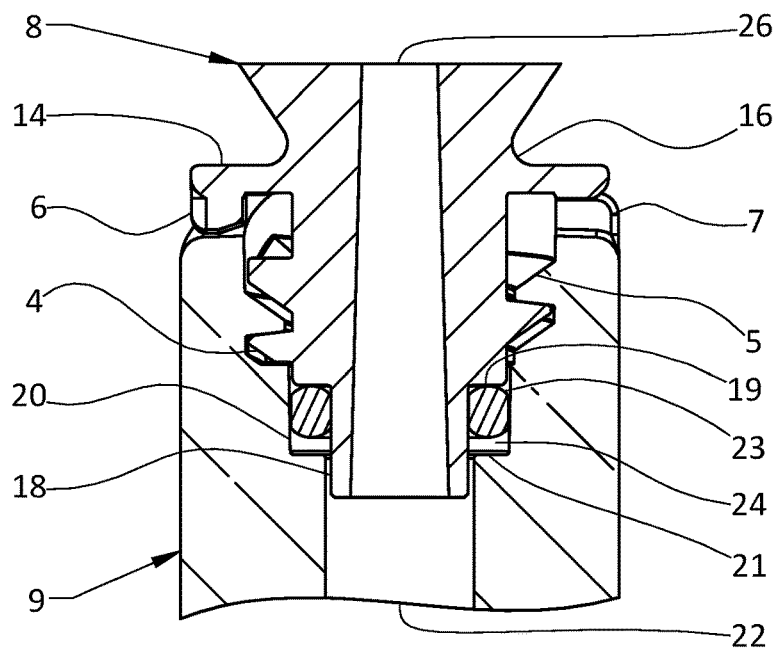
FIG. 5 is a cross sectional view showing the connection port of the pressure measurement assembly engaged with the receiving socket of the pressure vessel.

As shown in FIGS. 2 and 3, in addition to the external thread 4, the connection port 8 also preferably includes a stop flange 14 that includes at least one male engagement element 6 arranged on its outer edge. As shown in FIGS. 1, 5 and 7, the receiving socket 9 preferably includes a top rim 17 that provides at least one corresponding female engagement element 7 which receives the at least one male engagement element 6. These engagement elements 6 and 7, combined with the threads 4 and 5, are collectively configured to allow single-turn installation, alignment, and secure retention of the unitary gauge housing 2 to the pressure vessel 3.

As shown in FIGS. 2 and 3, the thread 4 on the unitary gauge housing 2 preferably includes a thread start 11 and a thread pitch 12 (see FIG. 2) that are configured to ensure the rotational alignment and the installed depth of the gauge housing connection port 8 into the receiving socket 9 (see FIG. 7). External thread 4 and internal thread 5 provide necessary axial force resistance to maintain the unitary gauge housing 2 positioning in relation to the pressure vessel 3 when fluid pressure within pressure vessel 3 is increased. Thread pitch 12 can preferably range from 9 to 17 turns per inch (approximately 3 mm to 1.7 mm) with a pitch approximately 12 turns in 1 inch (2.1 mm) being most preferred to minimize torque translated to the unitary gauge housing 2 due to the axial force exerted by fluid pressure in pressure vessel 3. Coarser thread pitch such as 9 threads per inch, for example, will result in substantially increased reactionary untorquing force, while finer thread pitch, such as 17 threads per inch, decreases the available cross sectional area for the external and internal threads 4 and 5, thereby reducing the ability of external and internal threads 4 and 5 to resist the axial force resulting from fluid pressure.

In addition to the stop flange 14 being provided on the connection port 8, preferably a thread end stop 13 (See FIG. 3) is provided on the thread 4 of the connection port 8 to prevent over-travel and axially constrain the unitary gauge housing 2. The thread end stop 13 may take the form of an extending protrusion at the end of the thread.

As shown in FIGS. 2 and 3, support ribs 15 are preferably provided effectively connecting the stop flange 14 and the unitary gauge housing 2 for resistance to bending moments placed upon the unitary gauge housing 2 once installed in the receiving socket 9. Preferably, a centering boss 10 (see FIGS. 2, 3 and 7) is provided adjacent the stop flange 14 to maintain a concentric relationship between the gauge housing connection port 8 and the receiving socket 9 of the pressure vessel 3.

Assuming two male engagement elements 6 are provided on the circumference of the stop flange 14 and two corresponding female engagement elements 7 are provided on the top rim 17 of the receiving socket 9, preferably both the male engagement elements 6 and the female engagement elements are generally positioned 180° from one another (see FIG. 2) to effect permanent installation once nested within one another. In this state, the male and female engagement elements 6 and 7 additionally prevent counter-rotation of the unitary gauge housing 2 due to torque induced by axial force translation through external thread 4 and internal thread 5. During rotational installation, the male engagement element 6 interferes with the top rim 17 of the receiving socket 9 and as such, the stop flange 14 and the male engagement element 6 is required to elastically deflect during the rotational installation process. Elastic deformation of stop flange 14 and the at least one male engagement element 6 is enabled by support rib clearance 16 (see FIG. 2) located directly above each male engagement element 6, the directionality and location of flats provided on centering boss 10 and the elasticity of the polymer material from which stop flange 14 is formed. Upon reaching complete rotational installation, the at least one male engagement element 6 and stop flange 14 return to their original shape once the at least one male engagement element 6 interlocks with the corresponding at least one female engagement element 7 on the receiving socket 9, causing the two connection ports to be permanently rotationally affixed. Stop flange 14 and centering boss 10 are thereby brought into intimate contact with the top rim 17 of the receiving socket 9 (see FIG. 7), preventing lateral and axial movement of the unitary gauge housing 2.

As such, the gauge housing 2 is retained by a unique thread form (provided by 4 and 5) and pair of retention features (provided by 6 and 7) that collectively allow the housing 2 to be quickly assembled to the pressure vessel 3, in correct orientation, with a secure seal without adhesives, tools or specialized equipment.

This unique thread form must be sufficiently robust to be able to withstand the axial force of the gauge being acted upon by the pressurized fluid in the pressure chamber 3. This axial force is dependent upon the system pressure during use and the area of the receiving port, but in the case of the specific example disclosed herein it must resist an axial load of up to 150 lbf.

This structure is capable of being assembled by inserting the housing connection port 8 into the pressure vessel socket 9 and rotating preferably one revolution, but potentially could be constructed to work with multiple rotations or as few as one half revolution. Upon completing the preferably single-turn installation, the gauge assembly 1 is automatically installed to the correct depth and the correct orientation. Installation depth and orientation is established by the consistency of the thread form location on both the housing 2 and the receiving socket 9 of the pressure chamber 3 and are maintained by the engagement element retention features 6 and 7. The male and female engagement elements 6 and 7, located on both the housing 2 and the receiving socket 9, respectively, nest within one another after the preferably single-turn assembly and are sufficiently robust as to reliably secure the gauge assembly 1 and maintain orientation. In order for each male engagement element 6 located on the stop flange 14 of the gauge housing 2 to nest within a corresponding female engagement element 7 on the receiving socket 9, it must deflect toward housing 2 upon contacting the top rim 17 of the receiving socket 9. The elastic deformation made possible by a clearance 16 in the support ribs 15 (see FIG. 2) prevents damage to support ribs 15 during installation of the pressure measurement assembly while still allowing them to reinforce connection port 8 against damage from loads applied to the sides of the gauge housing 2 during use. This clearance 16 allows the stop flange 14, and the attached engagement element 6 on the gauge housing 2 to elastically deflect away from the top rim 17 of the receiving socket 9 during installation without suffering permanent deformation. Upon final installation, the male engagement elements 6 rotate into permanent locking engagement with female engagement element 7, as the stop flange 14 and engagement elements 6 return to their original configuration. The axial position of the stop flange 14 in relation to the thread form 4 also allows the thread 4 to pull the gauge centering boss 10 into the receiving socket top rim 17 to create a secure, clearance free fit between the gauge housing 2 and the receiving socket 9. The stop flange 14 and retention elements 6 and 7 are located in a precise axial and radial location in relation to the thread profile which assures that the pressure sensing assembly 1 will always be located in the same position upon installation and be properly oriented for the convenience of the user of the device to which it is attached.

Manufacturing via plastic injection molding ensures very high accuracy and repeatability with regard to both the connection port 8 and receiving socket 9 geometries. The male engagement element(s) 6 and female engagement element(s) 7 eliminate the need for the application of external retention aids such as adhesives. This is especially important in the instance of a high-volume injection molded plastic receiving socket which can be fractured by adhesives due to stress released by chemical incompatibility or incomplete adhesive curing. This installation method is more efficient, requires no specialized equipment or training and enables high-volume production with automated equipment due to the repeatability of the features of the components.

As shown in FIGS. 2 and 3, preferably a nipple 18 is provided at the end of the connection port 8. Specifically, preferably the nipple 18 extends axially from the region of the gauge housing connection port 8 located proximally from the external thread 4 and protrudes from a distal shelf 19.

As shown in FIG. 5, preferably the receiving socket 9 of the pressure vessel 3 includes a bore 20 to receive an elastic sealing element 23, a proximal shelf 21, and a fluid port 22 located proximally from internal thread 5 (the term distal is used herein to refer to a point furthest from the pressure vessel 3, while and the term proximal is used herein to refer to a point nearest the pressure vessel 3). The nipple 18 and distal shelf 19 of the connection port 8 form one axial wall and one radial wall of the seal receptacle 24, respectively, while bore 20 and proximal shelf 21 of the receiving socket 9 form one axial wall and one radial wall of the seal receptacle 24, respectively, completing the seal receptacle 24. As shown in FIG. 5, fluid port 22 forms the fluid connection to the pressure vessel 3. Preferably, an elastomeric sealing element 23 is provided on the nipple 18 and is radially compressed within the seal receptacle 24 by the bore 20 and the nipple 18 to effect a fluid-tight seal between the unitary gauge housing 2 and the pressure vessel 3.

The structure disclosed herein creates a reliable seal between the housing 2 and the receiving socket 9 due to placement of a properly sized elastomeric seal 23 on the seal nipple 18 of the housing 2 below the thread form, whereby the seal becomes compressed circumferentially into a seal receptacle 24 in the receiving socket 9. The use of a circumferential seal is preferred over a face seal in this application as it allows for using the thread form merely for installation and retention of the pressure measurement assembly 1 instead of also having to apply axial compression upon an elastomeric seal. Circumferential seals are not reliant upon the threads to maintain compression to create an effective seal, nor do they apply a large amount of stress on the plastic socket 9 which can lead to creep failures. The depth of installation is fixed due to the position of the thread form of the housing 2 and receiving socket 9, thereby providing consistent interaction of the housing 2 and receiving socket 9 to create a reliable seal.

Figure 6:
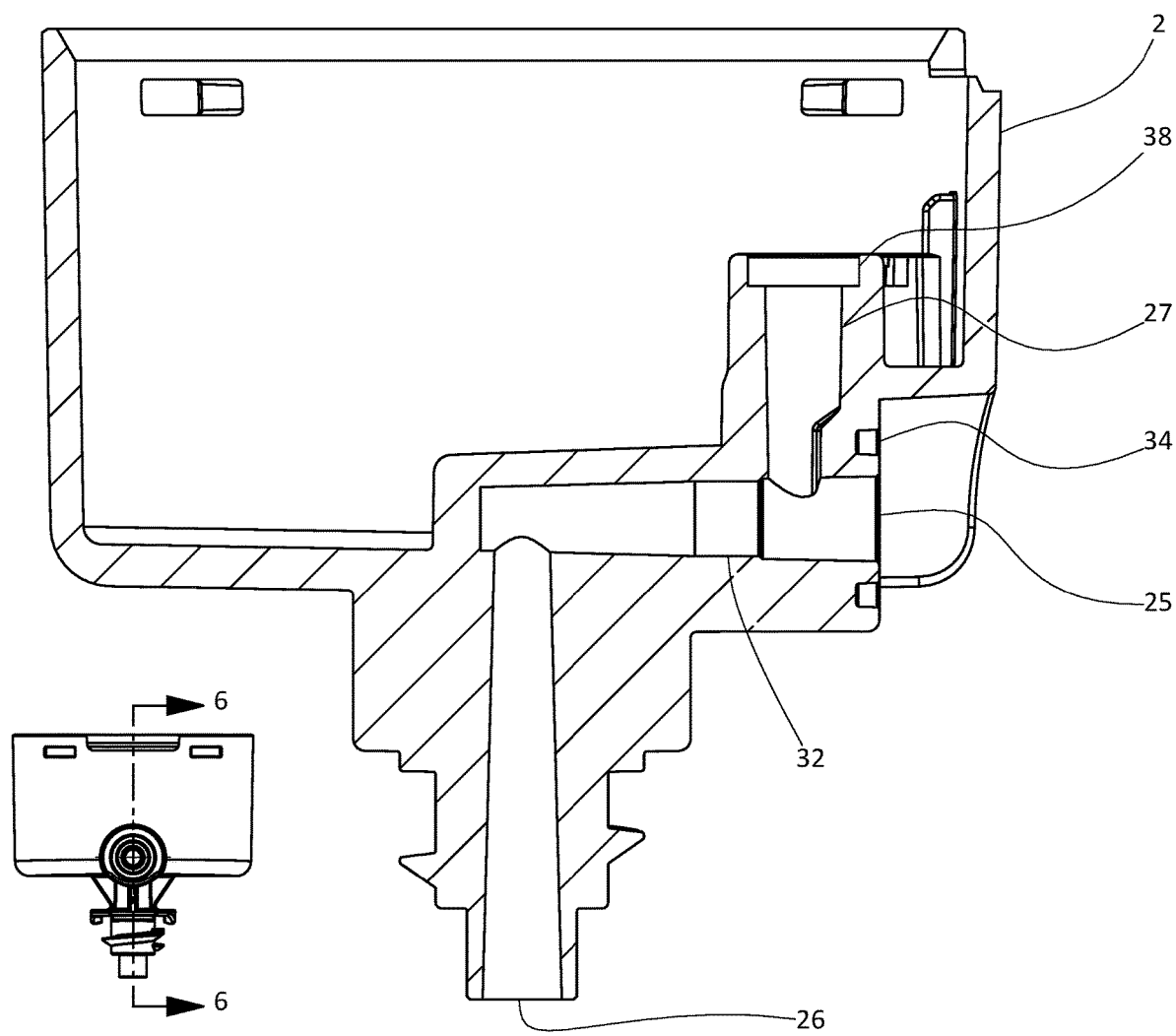
FIG. 6 is composite drawing, wherein on the lower left is a front view of the unitary gauge housing including a section line 6-6, and wherein on the upper right is a cross sectional view of the unitary gauge housing, taken along that 6-6 section line.

The unitary gauge housing 2 is preferably manufactured from a polymer utilizing a high-pressure injection molding process. The nature of the injection molding manufacturing process necessitates an open fluid passage 25 to withdraw a mold core in order to create connected fluid passageways, proximal fluid passage 26 and distal fluid passage 27, within unitary gauge housing 2, as shown in FIGS. 6 and 7. Proximal fluid passage 26 and distal fluid passage 27 enable pressure vessel 3 to communicate with pressure measurement module 28 through fluid passage 25 molded within the unitary gauge housing 2.

Figure 8:
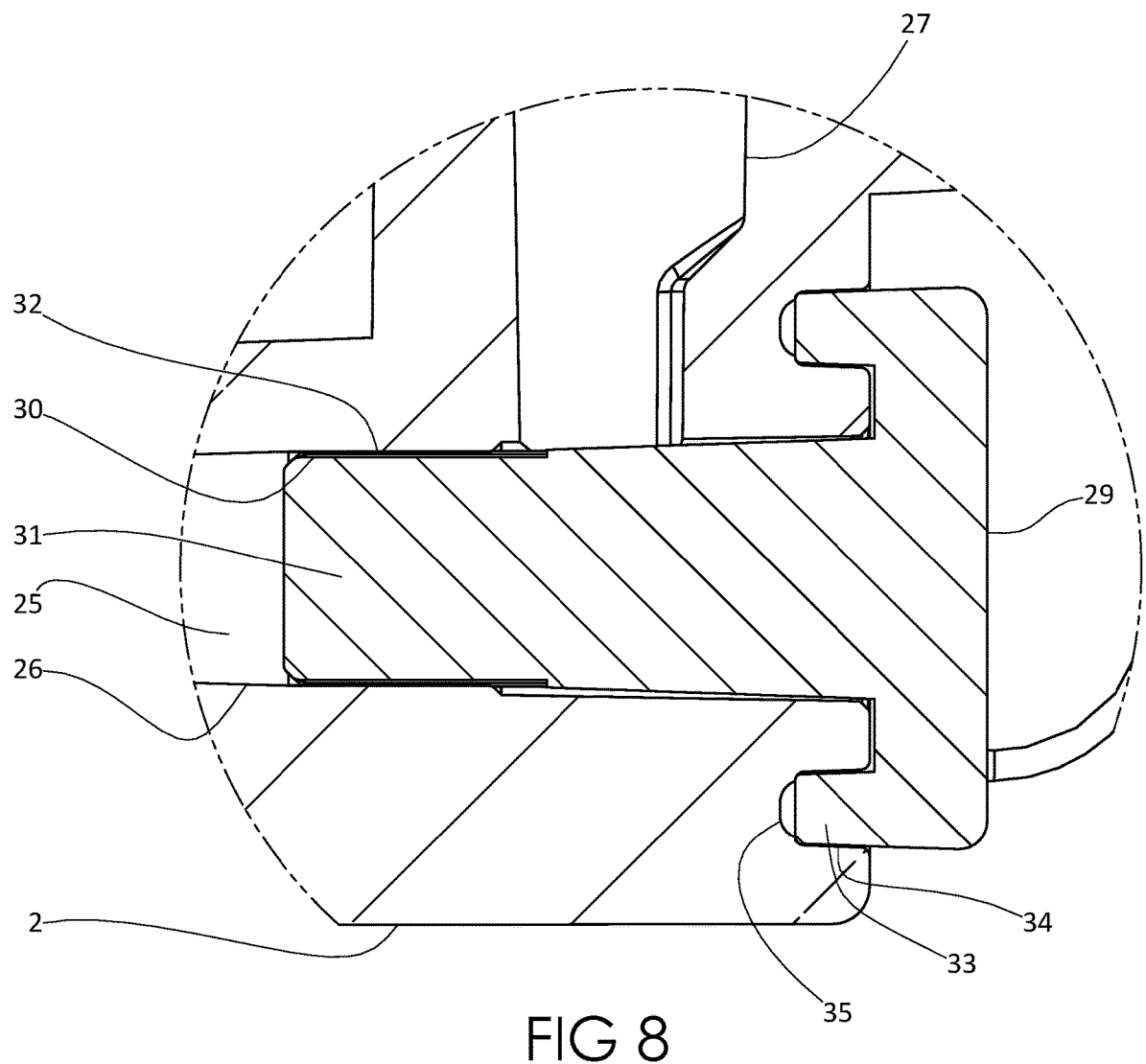
FIG. 8 is an enlarged view of a portion of FIG. 7, showing a flow restrictor plug and its engagement with the unitary gauge housing.

Preferably, a flow restrictor plug 29 (see FIG. 9) is provided to create a fluid-tight seal within open fluid passage 25. The flow restrictor plug 29 preferably includes a restrictor shaft 31 with restriction notches 30 provided on the restrictor shaft 31. As shown in FIGS. 7 and 8, the restrictor shaft 31 of the flow restrictor plug 29 inserts into fluid passage sleeve 32 of fluid passage 25 molded into the unitary gauge housing 2. The flow restrictor plug 29 is provided to restrict the flow of fluid between proximal fluid passage 26 and distal fluid passage 27 and thereby dampen the flow between fluid passage 26 and distal fluid passage 27. Open fluid passage 25 is configured with a larger first diameter than the restrictor shaft 31 and fluid passage sleeve 32, thereby allowing an unrestricted flow of fluid once it has passed through restriction notches 30 of the restrictor shaft 31 and into the distal fluid passage 27 between flow restrictor plug 29 and the pressure measurement module 28.

Module style gauges such as pressure measurement module 28 illustrated in FIG. 1 may be purchased "off-the-shelf" from a gauge manufacturer for integration into an assembly or finished product but do not typically come equipped with a method of controlling pressure shockwaves. The flow restrictor plug 29 as disclosed herein completes a sealed fluid communication passageway as well as provides flow restriction in the communicating passageway to prevent damage to the pressure measurement module 28 if the system is exposed to pressure shockwaves. Pressure shockwaves are generated by downstream external influences in the pressure chamber 3. One such example is the instantaneous depressurization of a system from maximum rated pressure. In a disposable medical inflation device for example, inflation of a balloon catheter followed by a very rapid decrease in pressure to a state of vacuum in order to withdraw the fluid from the balloon for therapeutic medical balloon movement or withdrawal will cause a pressure shockwave. The bourdon tube of an analog gauge module acts by predictably deforming from its "C" shape to a shape that is more similar to the linear profile from which it was created. As this deformation is predictable, the free end of the bourdon tube may be connected to a gear rack coupled with a pointer indicating the pressure within the bourdon tube. However, the same effect causes the bourdon tube to act as an un-dampened spring within the system and as such, when pressure is abruptly removed from the bourdon tube, it will oscillate rapidly between its pressurized position and beyond its unpressurized resting state. This oscillation causes extremely high inertial forces within the pressure measurement module as the bourdon tube and other moving components of the pressure measurement module are subjected to these oscillations. Often the indicator needle of a bourdon tube pressure measurement module is caused to sweep back and forth between maximum pressure to beyond the at rest position, sometimes reaching a mechanical limit from impact within the structure of the gauge resulting in a return in the opposite direction beyond the at-rest position and so forth several times until the un-dampened bourdon tube finally comes to a rest as all energy has been expended. This oscillation lasts for fractions of a second and can cause immense damage to the mechanism of an analog bourdon tube pressure measurement module if not adequately dampened.

The flow restriction plug 29 disclosed herein creates a dampening effect upon flow to the bourdon tube which reduces the quantity and amplitude of the oscillations thereby preventing damage to the gauge module 28. The flow restrictor plug 29 achieves this dampening effect by restricting fluid flow through the fluid communication passageway utilizing one or more linear restriction notches 30 arrayed on the circumference of the flow restrictor plug 29. The size of the restriction notches 30 can be controlled to provide an adequate level of cross-sectional area restriction for the application. These restriction notches 30 are preferable to use of a restrictor orifice bushing where in the case of a 1.5 inch round bourdon tube analog gauge module, such bushing orifices would be 0.02 square millimeters each, but depending on the application could be as small as 0.005 square millimeters each. Restriction orifices and passageways could also be provided in numerous alternate methods such as one or more orifices through the restrictor plug 29 or a precision radial clearance provided between the restrictor plug 29 and the socket 32. However, orifices and radial clearances sized to provide adequate flow restriction cross sectional area are difficult to produce with injection molding.

The flow restrictor plug 29 preferably includes one or more restriction notches 30, with more than one restriction notch being most preferred, as shown in FIG. 8. The restriction notches 30 should be tailored to a given application by adjusting the cross-sectional area and quantity of restriction notches 30. For example, a high viscosity fluid that has more resistance to fluid flow would require larger restriction passageway area, than a gas or thin fluid such as water. In the present exemplary embodiment, the working fluid has the viscosity of water therefore two restriction notches 30 are desirable in order to provide adequate dampening of shock loads applied to the pressure measurement module 28 as well as maintain a redundant restriction notch 30 should debris become lodged within one of the restriction notches 30. The restrictor shaft 31 is slightly larger than the fluid passage sleeve 32 in order to effect an interference fit to force fluid flowing through the proximal fluid passage 26, to pass through the restriction notches 30.

The flow restrictor plug 29 must be attached to the unitary gauge housing 2 in a manner that creates a hermetic seal capable of withstanding axial forces exerted by the pressurized fluid contained within proximal fluid passage 26. In the immediate example assembly, the restrictor plug 29 would be expected to withstand 45 lbf in order to provide a 2× safety factor for a gauge assembly operating pressure of 1,000 psi. To achieve such performance at a high gauge production rate, ultrasonic welding of flow restrictor plug 29 to the unitary gauge housing 2 is preferred as the most desirable retention method, however, this attachment could also be accomplished through solvent welding, adhesive bonding, friction welding, friction fit, threaded assembly or, any number of other fastening methodologies.

Figure 9:
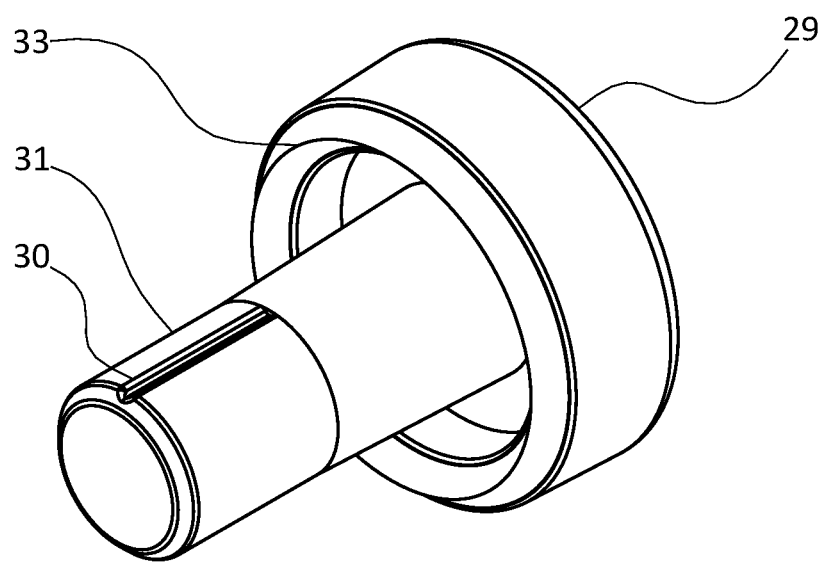
FIG. 9 is a perspective view of the flow restrictor plug.

As shown in FIG. 9, preferably an energy director 33 is provided on the flow restrictor plug 29 and, as shown in FIG. 8 and preferably a corresponding welding socket 34 is provided on the unitary gauge housing 2 to establish a hermetic seal of substantial strength. During the welding process, the energy director 33 on the flow restrictor plug 29 is displaced into the welding socket 34 on the unitary gauge housing 2, thereby creating a hermetically sealing weld joint 35 between the flow restrictor plug 29 and the unitary gauge housing 2.

Figure 10:
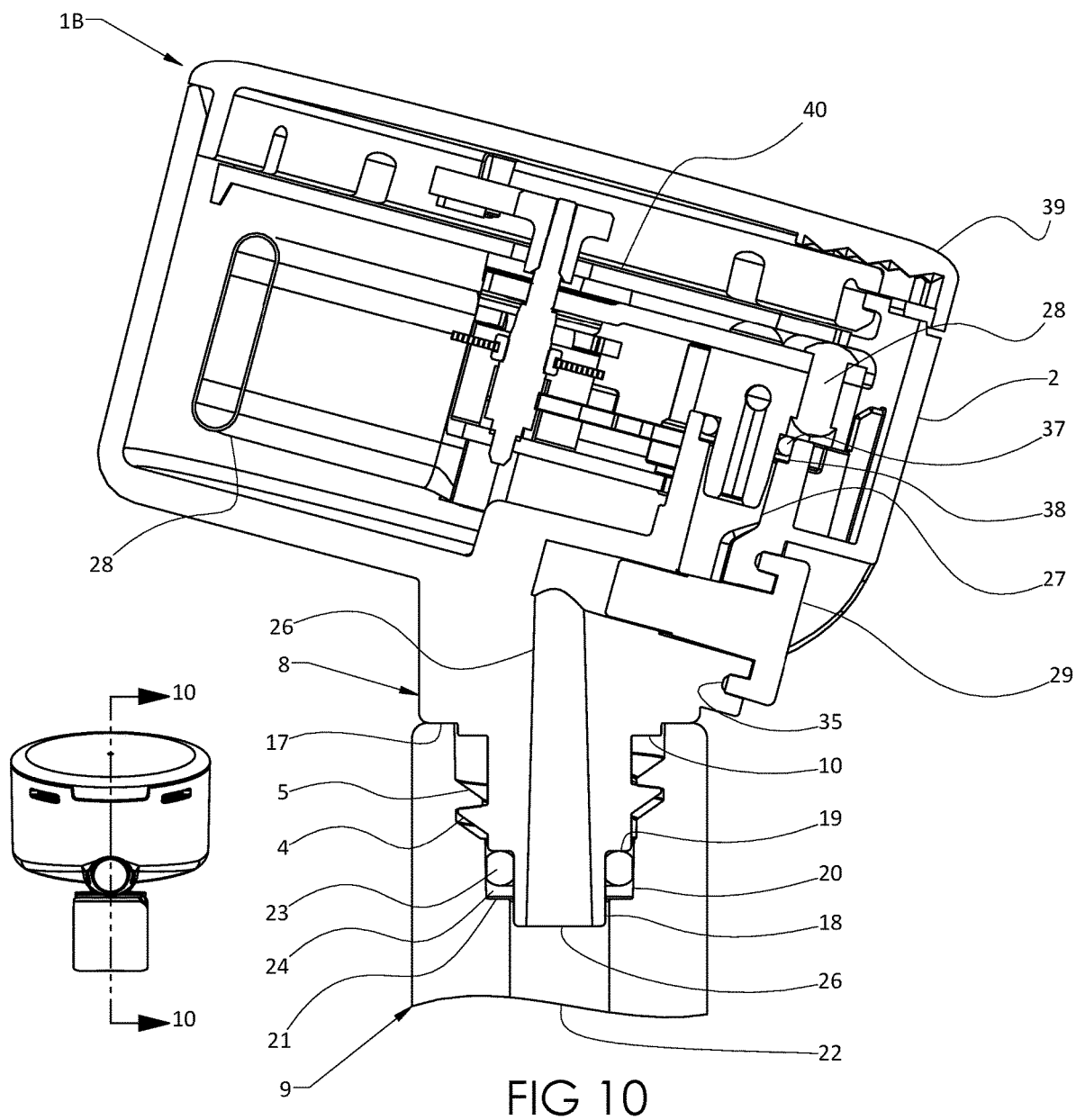
FIG. 10 is composite drawing, wherein on the lower left is a front view an alternate embodiment of the unitary gauge housing including a section line 10-10, and wherein on the upper right is a cross sectional view of the alternate embodiment of the unitary gauge housing, taken along that 10-10 section line.
Figure 11:
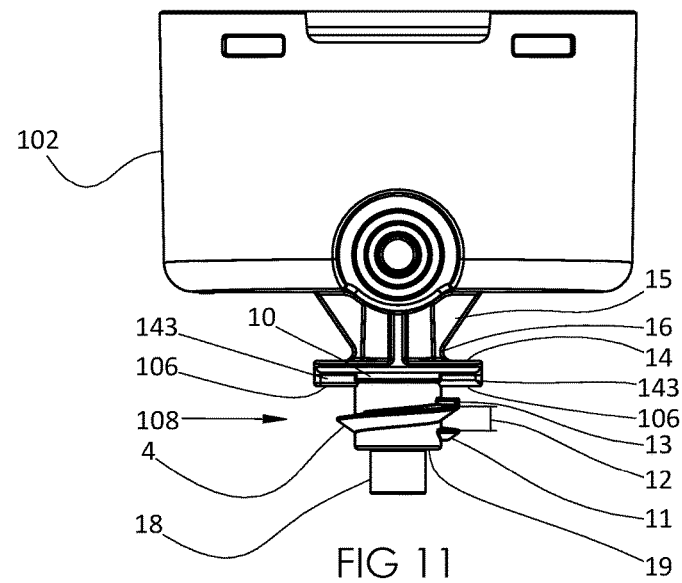
FIG. 11 is a view like FIG. 2, but relates to a second embodiment of the present invention.

An alternate embodiment for the gauge housing structure 15, shown in FIG. 10 in a cross-sectional view similar to FIG. 7, provides an alternative pressure measurement assembly 1B where the gauge indicator face 40 is positioned at an angle that need not be perpendicular or parallel to the gauge mount's central axis. All the components are basically the same and like reference numerals are used to identify like parts. Injection molding the housing 2 of gauge assembly 1B from plastics allows the flexibility to alternatively mount the pressure measurement module 28 tilted at an angle such as shown in the cross-sectional view contained in FIG. 10, in order to aid the user's viewing of the gauge indicator face 40. This angle may be impacted by the fluid communicating passage intersections and the size of the gauge dial face but is preferably 14 degrees in the case of the exemplary gauge. However, this angle may be increased to as much as 90 degrees or as little as zero degrees from perpendicular to the central axis of the gauge mounting socket 9 (such as shown in FIGS. 1-3 and 7).

Disposable medical devices are one example of a device that would benefit greatly by incorporation of either embodiment of the present invention. Ideally, all components of this structure can be injection molded and therefore the design is adaptable to a multitude of pressure measurement modules and finished devices.

A significant additional benefit of the gauge mounting method described herein is its ability to provide for a reduction in metal required to manufacture the gauge assembly. Typically, a gauge assembly is built around the main socket component (the connection port extending from the gauge) that contains the fluid passages such as a threaded stem used for connection to the final device. Pressure measurement modules of various constructions are described in patents such as U.S. Pat. Nos. 6,314,816 and 6,684,712. The use of a pressure measurement module of this type eliminates a large amount of the base metal of a common gauge, often brass, by replacing that metal with a smaller and lighter quantity of plastic for the connection port. Significantly, use of this mounting method in, for example, a high-volume disposable medical device can eliminate a large amount of metal, typically brass, from each unit. In the case of the exemplary 1.5" center-back mounted analog pressure gauge discussed herein, 80% less brass is required for each unit. This leads to weight savings for both ease of use and transport and also decreases a large mass of expensive scrap material when these devices are disposed into the waste stream. Injection molding the gauge housing from plastics also provides greater design flexibility for alternatively mounting the pressure measurement module at more desirable angles (such as is shown in FIG. 10) in order to optimize a user's view of the dial face.

FIGS. 11-20 show additional embodiments of the present invention, and like reference numbers are used to indicate like parts. The embodiments shown in FIGS. 11-20 involve alternate strategies for configuring and placing the male and female engagement features in order to provide more flexibility and robustness in the design of devices utilizing this connection.

FIGS. 11-16 relate to a second embodiment. Compared to the first embodiment described herein, the second embodiment provides that the complimentary male 106 and female 107 engagement components have been modified by disposing with the ramped loading edge form of male engagement feature 6 and the accommodating receiving notch form utilized in the female engagement feature 7 to provide a more robust interference perpendicular to the flange 14 of the gauge housing 102 and receiving socket 109. The advantage of this construction is to provide a more secure connection between the unitary gauge housing and the pressure vessel. The configuration of the engagement features 106 and 107 provides resistance against overriding the desired installation location as well as resistance to removal. This construction takes advantage of the advancement of the threaded receiving socket connection and deflection properties of deflectable flange 14 made possible by relief 16 in support rib 15 of gauge housing 102 to create a secure locking condition between these two components once fully mated.

FIGS. 17-20 relate to a third embodiment. In this embodiment, the complimentary male and female engagement features have been reversed, placing the male engagement feature 206 on the receiving socket 209 and the female engagement feature 207 on the gauge housing connection port 208. In both the second and third embodiment, the essential mechanism remains the same.

The second and third embodiments will now be described in further detail.

Figure 12:
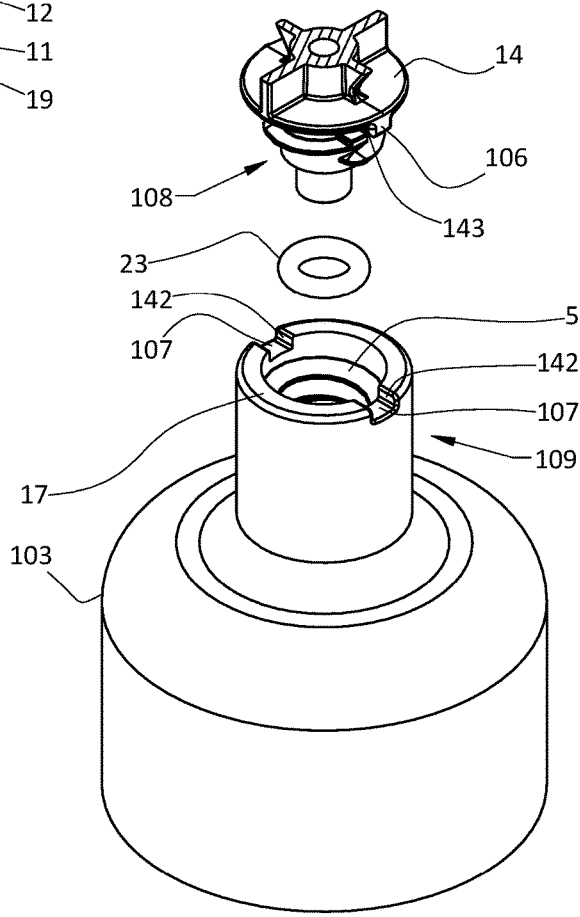
FIG. 12 is a perspective, exploded view of the pressure measurement assembly shown in FIG. 11, showing the gauge connection port (sectioned from the unitary gauge housing in order to more easily view the engagement features) and the receiving socket.

In the second embodiment, as shown in FIGS. 11 through 14, the gauge housing connection port 108 also preferably utilizes a deflectable flange 14 and includes at least one male engagement feature 106 upon its lower edge. As shown in FIG. 12, the receiving socket 109 preferably includes a top rim 17 that provides at least one corresponding female engagement feature 107, to receive the male engagement feature 106. These complementary engagement features 106 and 107, combined with the threads 4 and 5, are collectively configured to allow single-turn installation, alignment, and secure non-removable retention of the unitary gauge housing 102 to the pressure vessel 103.

Figure 15:
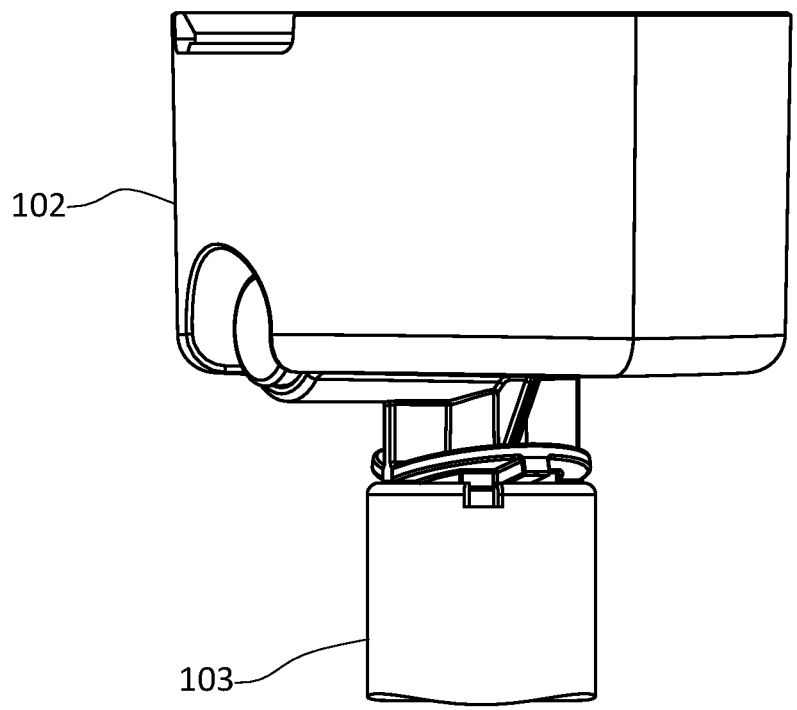
FIG. 15 is a right-hand view in relation to the pressure vessel with the unitary gauge housing partially assembled (see FIG. 13) in order to show the deflection of the deflectable flange and engagement features.
Figure 16:
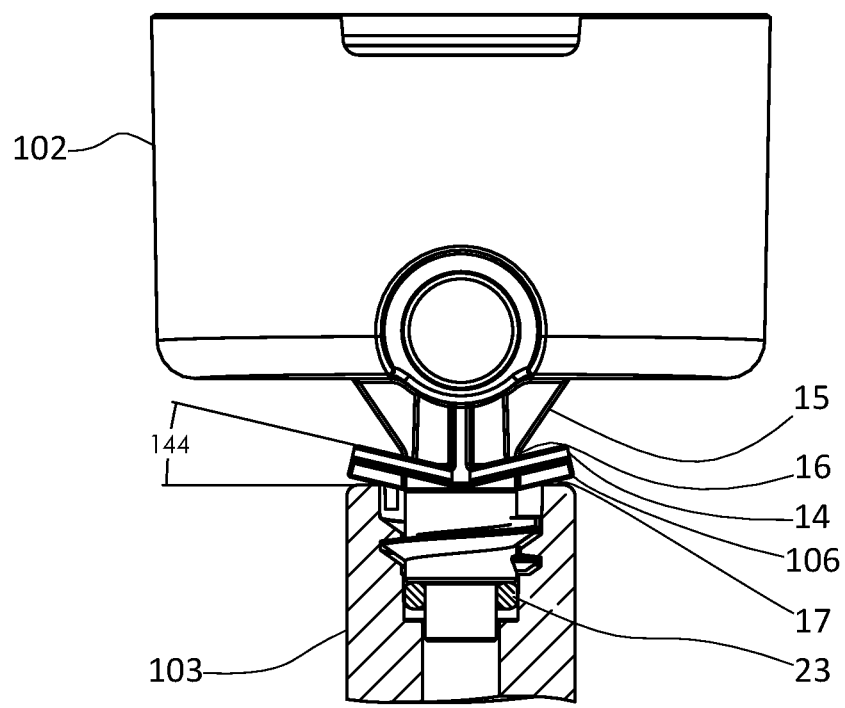
FIG. 16 is a front view in relation to the pressure vessel with the unitary gauge housing partially assembled (see FIG. 13) in order to show the deflection of the deflectable flange and engagement features, wherein the receiving socket is sectioned to show the thread and engagement feature interaction.
Figure 17:
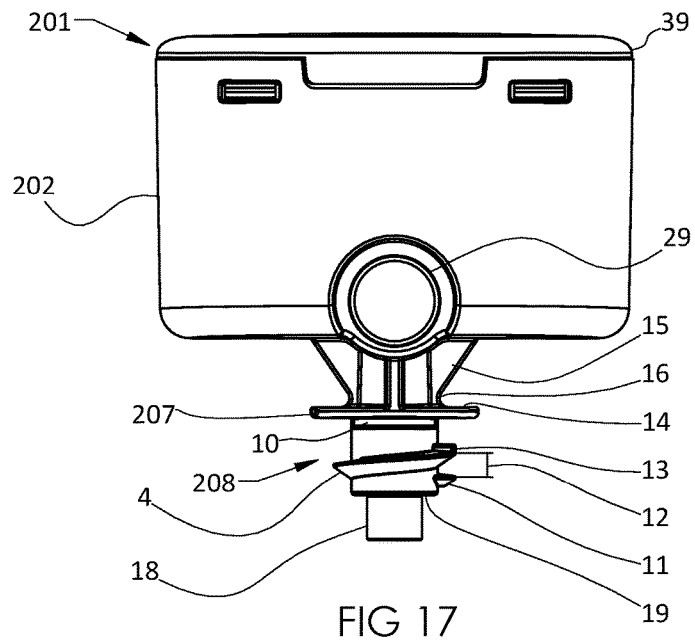
FIG. 17 is front view of the unitary gauge housing of a third embodiment of the present invention.

The male and female engagement features 106 and 107, located on both the gauge housing connection port 108 of unitary gauge housing 102 and the receiving socket 109 of the pressure vessel 103, respectively, lock to one another after the preferably single-revolution assembly and are sufficiently robust as to reliably secure the gauge assembly 101 to receiving socket 109 and maintain orientation. In order for the male engagement features 106 located on the deflectable flange 14 of the unitary gauge housing 102 to lock to the female engagement features 107 located on the top rim 17, the deflectable flange 14 is configured to deflect elastically once the male engagement feature 106 is drawn into contact with the top rim 17 by the interaction of threads 4 with threads 5 of the receiving socket 109 (see FIGS. 15 and 16). In the example shown, the gauge housing connection port 108 is pulled into the receiving socket 109 by engaging, rotating and tightening thread 4 of gauge connector port 108 into complimentary threads 5 of receiving socket 109. It should be understood that although right hand threads are illustrated herein, left hand threads could also be configured to function in the same manner. This engagement of threads 4 and 5 translates the gauge housing connection port 108 axially into the connection port 109 causing interference between male engagement feature 106 and top rim 17 thereby causing deflectable flange 14 to deform elastically as shown in FIGS. 15 and 16. This elastic deformation is made possible by a clearance 16 in the support ribs 15 (see FIG. 2) provided to prevent damage to the gauge housing 102 in instances of side loads against gauge housing 102 after installation. This clearance 16 allows the deflectable flange 14, provided with attached male engagement feature 106, on the gauge housing 102 to deflect away from the top rim 17 and female engagement feature 107 of the receiving socket 109 during installation. Upon complete installation, the complimentary engagement features 106 and 107 engage with one another and the deflectable flange 14 with male engagement feature 106 returns to its original shape and location. The axial position of the deflectable flange 14 in relation to the thread form 4 also allows the thread 4 to pull the gauge housing deflectable flange 14 onto the receiving socket top rim 17 and create a secure, clearance free fit between the gauge housing 102 and the receiving socket 109. The deflectable flange 14 and complimentary engagement feature 106 and 107 are located in a precise axial and radial location in relation to the thread profile, orientation, and pitch, which allows them to coincide with one another upon installation. The thread pitch 12 is influenced by the pitch required to resist the axial forces placed upon threads 4 and 5 by internal pressure as well as the height of engagement feature 106. Engagement feature 106 is a significant factor in the determination of thread pitch 12 due to the need to maintain elastic deformation of deflectable flange 14 and avoid permanent deformation while also ensuring a secure non-removable engagement between features 106 and 107 once fully installed.

Figure 13:
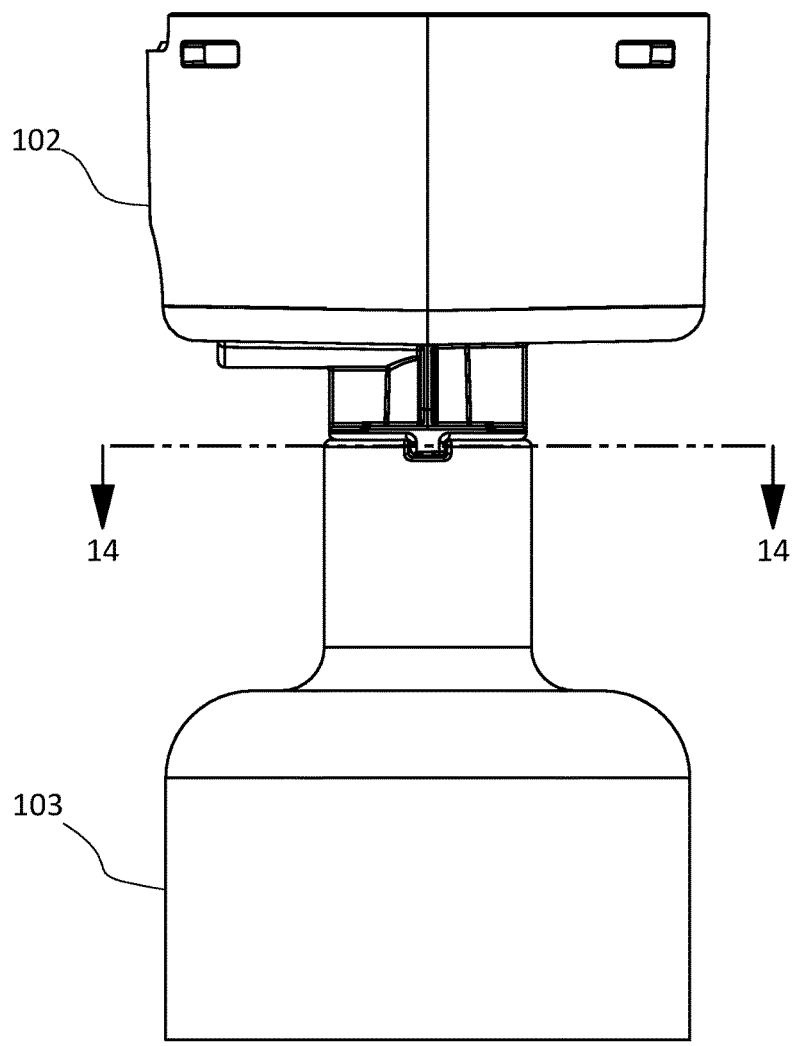
FIG. 13 is a side view of the assembled pressure measurement assembly relating to the second embodiment.
Figure 14:
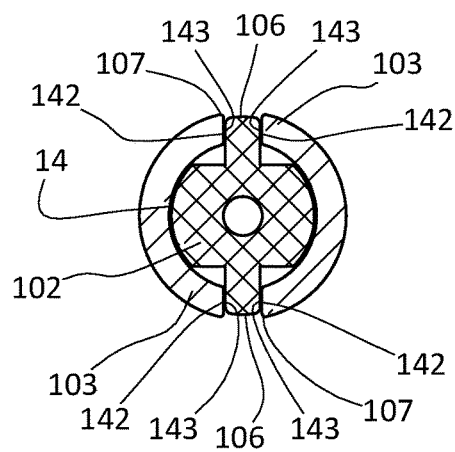
FIG. 14 is a cross sectional view of a connection port of the pressure measurement assembly shown in FIGS. 11-13, taken along line 14-14 of FIG. 13.

The at least one male engagement feature 106 located on the deflectable flange 14 of the gauge housing connection port 108 is configured with perpendicular surfaces 143 to the deflectable flange 14 as shown in FIGS. 11 through 14. The at least one female engagement feature 107 located on the top rim 17 of the connection port 109 is also configured with perpendicular surface 142 to the top rim 17 as shown in FIGS. 12 through 14. These perpendicular surfaces 143 of male engagement feature 106 engage with the perpendicular surface 142 of female engagement feature 107 on top rim 17 to prevent rotation in either direction once installation is complete. The opposite perpendicular surfaces 143 prevent counter-rotation and assist thread end stop 13 to prevent overriding of the installation location.

Manufacturing via plastic injection molding ensures very high accuracy and repeatability with regard to both the connection port 108 and receiving socket 109 geometries. These complimentary engagement features 106 and 107 eliminate the need for the application of external retention aids such as adhesives. This is especially important for a high-volume injection molded plastic receiving socket, which can be fractured by adhesives due to stress released by chemical incompatibility or incomplete adhesive curing. This installation method is more efficient, requires no specialized equipment or training, always ensures the gauge is installed in proper orientation for legibility by a user, and enables high-volume production using automated equipment due to precise repeatability of the components' features.

Figure 18:
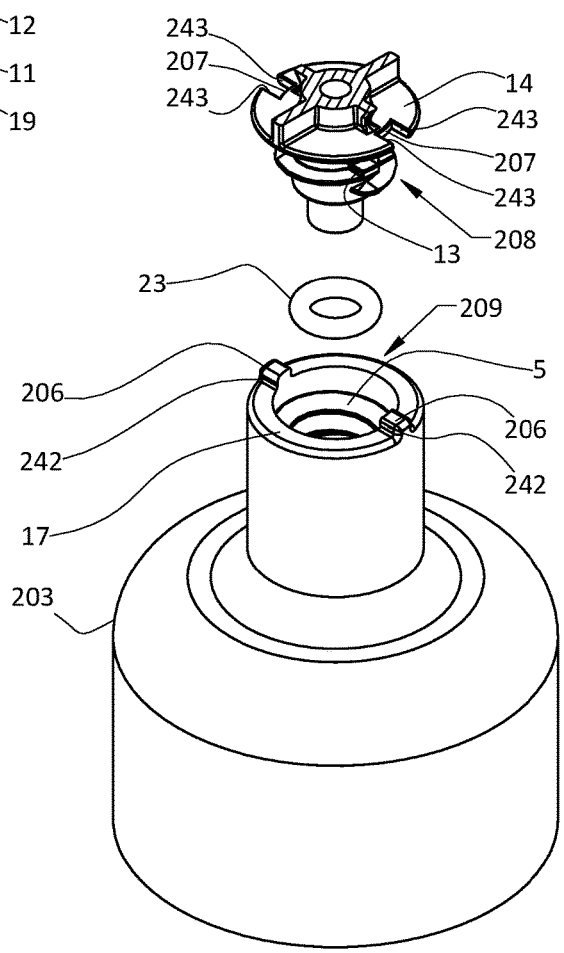
FIG. 18 is a perspective, exploded view of the pressure measurement assembly shown in FIG. 17, showing the gauge connection port (sectioned from the unitary gauge housing in order to more easily view the engagement features) and the receiving socket.

With regard to the third embodiment, as shown in FIGS. 17 through 20, the connection port 208 preferably includes a deflectable flange 14 that includes at least one female engagement feature 207 arranged on its outer edge. As shown in FIG. 18, the receiving socket 209 preferably includes a top rim 17 that provides at least one corresponding male engagement feature 206, which receive the female engagement feature 207. These complementary engagement features 206 and 207, combined with the threads 4 and 5, are collectively configured to allow single-turn installation, alignment, and secure non-removable retention of the unitary gauge housing 202 to the pressure vessel 203.

The male and female engagement features 206 and 207, located on both the housing 202 and the receiving socket 209, respectively, engage with one another after the preferably single-revolution assembly and are sufficiently robust as to reliably secure the gauge assembly 201 and maintain its proper orientation. In order for the male engagement features 206 located on the top rim 17 of the receiving socket 209 to engage with the female engagement features 207 on the deflectable flange 14, the deflectable flange 14 must deform elastically once brought into contact with the male engagement features 206 of the receiving socket 209. The gauge housing connection port 108 is pulled into the receiving socket 109 by rotationally engaging complimentary threads 4 and 5. This engagement of threads 4 and 5 translates the gauge housing connection port 208 axially into the connection port 209 causing interference between female engagement feature 207 and the male engagement feature 206 on deflectable flange 14 thereby causing deflectable flange 14 to deform elastically. This elastic deformation is made possible by a clearance 16 in the support ribs 15 (see FIG. 2) provided to prevent damage to the gauge housing 202 in instances of side loads against gauge housing 202 after installation. This clearance 16 allows the deflectable flange 14, and the attached female engagement feature 207 on the gauge housing 202 to momentarily deflect away from the top rim 17 and male engagement features 206 of the receiving socket 209 during installation. Upon complete installation, the complimentary engagement features 206 and 207 lock to one another as the deflectable flange 14 with female engagement feature 207 returns to its original shape. The axial position of the deflectable flange 14 in relation to the thread form 4 also allows the thread 4 to pull the gauge housing deflectable flange 14 onto the receiving socket top rim 17 and create a secure, clearance free fit between the gauge housing 202 and the receiving socket 209. The deflectable flange 14 and complimentary engagement features 206 and 207 are located in a precise axial and radial location in relation to the thread profile, orientation, and pitch, which allows them to coincide with one another upon installation. The thread pitch 12 is influenced by the pitch required to resist the axial forces placed upon threads 4 and 5 by internal gauge service pressure as well as the height of engagement feature 206. Engagement feature 206 is therefore a contributing factor in the determination of thread pitch 12 due to the need to maintain elastic deformation of deflectable flange 14 and avoid permanent deformation while also ensuring a secure non-removable engagement between features 206 and 207 once fully installed.

Figure 19:
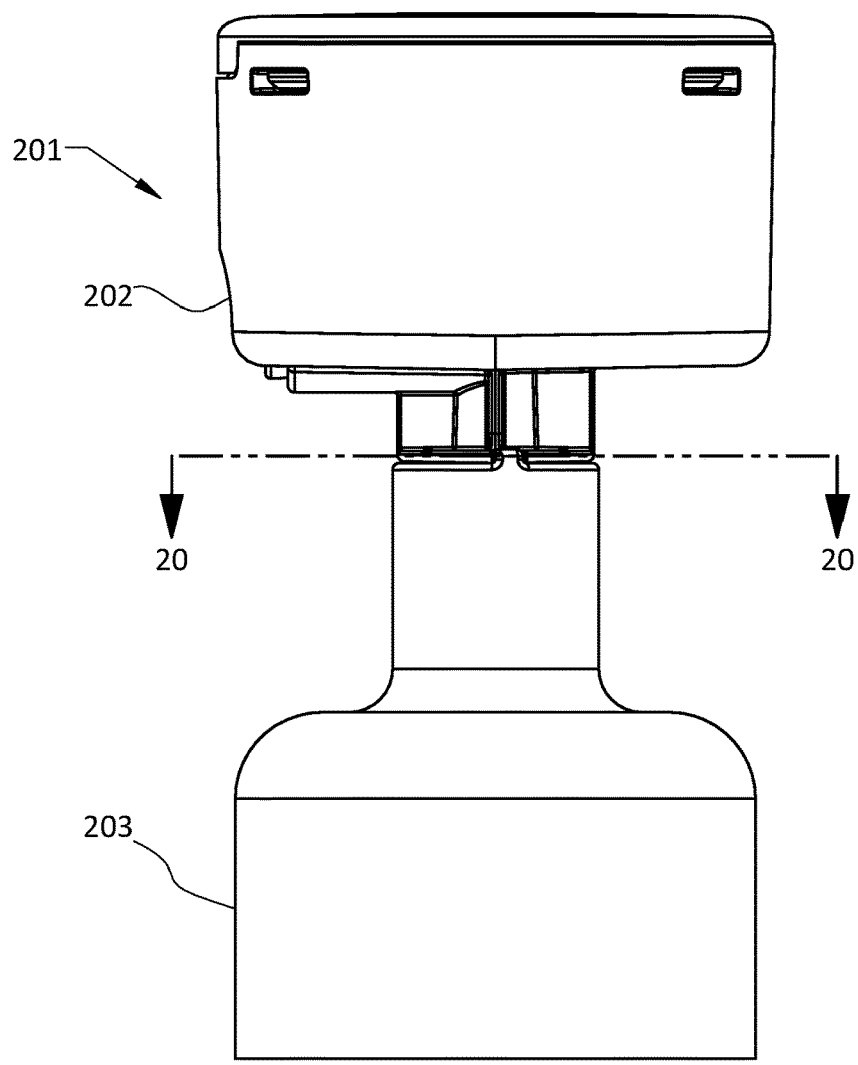
FIG. 19 is a side view of the assembled pressure measurement assembly relating to the third embodiment.
Figure 20:
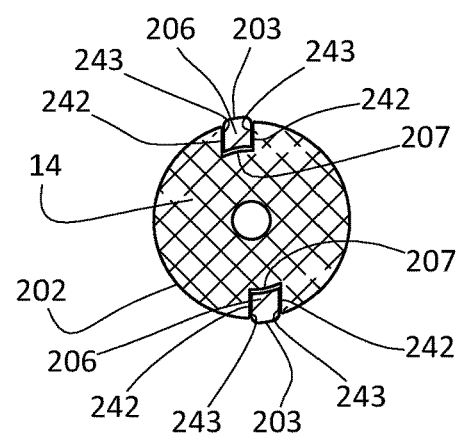
FIG. 20 is a cross sectional view of a connection port of the pressure measurement assembly relating to the fourth embodiment, taken along line 20-20 of FIG. 19.

The at least one male engagement feature 206 located on the top rim 17 of the connection port 209 is configured with surfaces 242 positioned perpendicular to the top rim 17 as shown in FIGS. 18 through 20. The at least one female engagement feature 207 located on the deflectable flange 14 of the gauge housing connection port 208 is also configured with surfaces 243 perpendicular to the deflectable flange 14 as shown in FIGS. 17 through 20. The perpendicular surfaces 242 of male engagement features 206 on top rim 17 engage with the perpendicular surfaces 243 of female engagement features 207 on deflectable flange 14 to prevent rotation in either direction once installation is complete. The two sets of perpendicular surfaces 242 and 243 prevent counter-rotation in either direction in addition to assisting thread end stop 13 to prevent overriding of the installation location.

Much like with the previous embodiment, manufacturing via plastic injection molding ensures very high accuracy and repeatability with regard to both the connection port 208 and receiving socket 209 geometries. The complementary engagement features 206 and 207 eliminate the need for the application of external retention aids such as adhesives. This is especially important for a high-volume injection molded plastic receiving socket, which can be fractured by adhesives due to stress released by chemical incompatibility or incomplete curing. This installation method is more efficient, requires no specialized equipment or training, always ensures the gauge is installed in proper orientation for legibility by a user, and enables high-volume production using automated equipment due to the repeatability of the features of the components.

While specific embodiments of the invention have been shown and described, it is envisioned that those skilled in the art may devise various modifications without departing from the spirit and scope of the present invention.

What is claimed is:

1. A pressure gauge attachment system comprising: a first member comprising a socket, wherein the socket comprises a thread and at least one engagement element; a second member comprising a connection port, wherein the connection port comprises a thread and at least one engagement element, wherein during installation of the connection port into the socket, the thread of the connection port engages the thread of the socket and the at least one engagement element of the connection port deflects and provides an interlock with the at least one corresponding engagement element of the socket.

2. The pressure gauge attachment system as recited in claim 1, wherein the first member comprises a pressure vessel and the second member comprises a pressure measurement assembly.

3. The pressure gauge attachment system as recited in claim 1, wherein the connection port comprises a stop flange, wherein the at least one engagement element of the connection port is provided on the stop flange, said thread on the connection port comprising a thread stop.

4. The pressure gauge attachment system as recited in claim 3, wherein the thread stop comprises an extending protrusion.

5. The pressure gauge attachment system as recited in claim 1, wherein the socket comprises a rim, wherein the at least one engagement element of the socket is provided on the rim.

6. The pressure gauge attachment system as recited in claim 1, wherein the at least one engagement element of the socket comprises two engagement elements spaced 180 degrees apart, and wherein the at least one engagement element of the connection port comprises two engagement elements spaced 180 degrees apart.

7. The pressure gauge attachment system as recited in claim 6, wherein the socket comprises a rim, and wherein the two engagement elements of the socket are on the rim.

8. The pressure gauge attachment system as recited in claim 6, wherein the connection port comprises a stop flange, and wherein the two engagement elements of the connection port are on the stop flange.

9. The pressure gauge attachment system as recited in claim 6, wherein the socket comprises a rim, wherein the two engagement elements of the socket are on the rim, wherein the connection port comprises a stop flange, and wherein the two engagement elements of the connection port are on the stop flange.

10. The pressure gauge attachment system as recited in claim 1, wherein the connection port comprises a stop flange, wherein the at least one engagement element of the connection port is provided on the stop flange, wherein the second member comprises a gauge housing and support ribs, wherein the support ribs connect the gauge housing to the stop flange.

11. The pressure gauge attachment system as recited in claim 1, wherein the connection port comprises a stop flange, wherein the at least one engagement element of the connection port is provided on the stop flange, said thread on the connection port comprising a thread stop, wherein the socket comprises a rim, wherein the at least one engagement element of the socket is provided on the rim, wherein the stop flange of the connection port and the rim of the socket contact each other when the connection port is fully installed in the socket.

12. The pressure gauge attachment system as recited in claim 1, wherein the connection port comprises a distal shelf and an end, wherein the connection port comprises a nipple at the end, and wherein said nipple protrudes from the distal shelf.

13. The pressure gauge attachment system as recited in claim 12, further comprising an elastomeric sealing element on the nipple, wherein the elastomeric sealing element compresses circumferentially during installation of the connection port into the socket.

14. The pressure gauge attachment system as recited in claim 1, wherein the second member comprises a fluid passage sleeve and a flow restrictor plug disposed in the fluid passage sleeve.

15. The pressure gauge attachment system as recited in claim 14, wherein the flow restrictor plug comprises a restrictor shaft and at least one restricting notch on the restrictor shaft, wherein the flow restrictor plug restricts fluid flow except along the at least one restricting notch.

16. The pressure gauge attachment system as recited in claim 1, wherein the socket comprises a rim, wherein the at least one engagement element of the socket is on the rim perpendicular thereto, wherein the connection port comprises a stop flange, and wherein the at least one engagement element of the connection port is on the stop flange perpendicular thereto.

17. The pressure gauge attachment system as recited in claim 1, wherein the at least one engagement element of the socket is female, and wherein the at least one engagement element of the connection port is male.

18. The pressure gauge attachment system as recited in claim 1, wherein the at least one engagement element of the socket is male, and wherein the at least one engagement element of the connection port is female.

19. The pressure gauge attachment system as recited in claim 1, wherein the second member comprises a polymeric housing for a gauge module, said polymeric housing comprising: an enclosure for the gauge module, said connection port in fluid communication with the gauge module, said connection port comprising an outer circumference, said thread of said connection port having one revolution of functional connecting thread about its outer circumference for engaging the socket of the first member; an elastically bendable radial flange disposed on the communication port, said flange having a lock engagement feature and configured to deflect upon contact with a first opposing face of the thread of the socket of the first member before the thread of the connection port is fully engaged, wherein the at least one engagement element of the socket comprises a mating locking element which engages the elastically bendable radial flange to prevent rotation of the polymeric housing.

20. A polymeric housing for a gauge module comprising: an enclosure for the gauge module, a port for fluid communication with the gauge module, said port having one revolution of functional connecting thread about its outer circumference for engaging a mating receiving socket; an elastically bendable radial flange disposed upon the communication port, said flange having a lock engagement feature and configured to deflect upon contact with the first opposing face of a thread bearing receiving socket before the connecting thread is fully engaged whereby the receiving socket has a mating locking element to engage the radial flange lock engagement feature to prevent rotation of the polymeric housing.

* * * * *